Patented Apr. 25, 1950

2,505,746

UNITED STATES PATENT OFFICE 2,505,746

COCONUT PRODUCT AND METHOD

Walter F. Straub, Chicago, Ill., assignor to W. F. Straub & Company, Chicago, Ill., a corporation of Illinois No Drawing. Application October 11, 1947, Serial No. 779,415

8 Claims. (Cl. 9—125)

This invention relates to a novel coconut product having improved properties as compared with coconut products previously available.

In the production and marketing of packaged shredded coconut of the type used for bakery, confectionery, and household purposes, two important problems are encountered. The texture and palatability of shredded coconut is dependent largely upon its moisture content, the dried shreds being brittle and tasteless whereas the relatively moist product has a pleasing texture and flavor. On the other hand, mold growth is encouraged at high moisture levels. Accordingly, the problem is presented of providing a sufficiently high moisture content in the packaged coconut to insure palatability but at the same time avoiding tendencies toward excessive mold growth.

The usual packaged coconut product has a moisture content in the neighborhood of 5 per cent. This moisture content is usually maintained by adding glycerine to the shredded coconut as a hygroscopic agent. Sugar syrup and salt are also commonly added for flavoring purposes. It has been suggested that propylene or butylene glycol can be substituted for glycerine in limited amounts with the result that a somewhat higher moisture content, of the order of 15 per cent, can be maintained without encountering excessive mold growth. An alternative technique for preparing a coconut product of relatively high moisture content involves the use of glycerine, pasteurization, and packaging in sealed containers. Obviously, the latter method is quite expensive.

The use of glycerine or glycols as hygroscopic agents or humectants for shredded coconut has the obvious disadvantage that these additives are synthetic materials having no food value which can be employed in only limited quantities and which markedly detract from sales appeal and marketability.

A primary object of the present invention is to provide an economical shredded coconut product having a relatively high moisture content and a correspondingly good palatability without the necessity of utilizing synthetic hyroscopic agents or humectants.

Another object of the invention is to provide a packaged coconut product containing a hygroscopic agent having combined food value and moisture-retention properties.

A further object of the invention is to provide a new shredded coconut product containing a natural hygroscopic agent which also has the effects of intensifying the coconut flavor, increasing the food value of the finished product, imparting a natural sweetness, inhibiting rancidity of the natural coconut oils, and minimizing mold growth.

Still another object of the invention is to provide a shredded coconut product containing a natural hygroscopic agent which functions to maintain a high moisture content commensurate with a high degree of palatability and which at the same time is more economical than the synthetic hygroscopic agents heretofore proposed.

In one specific embodiment, my invention comprises shredded coconut having composited therewith or added thereto an effective amount of liquid honey as a natural hygroscopic agent.

As hereinbefore mentioned, the synthetic materials previously suggested as hygroscopic agents for coconut have serious disadvantages. In the first place, the quantities of the synthetic agents, such as glycerine and propylene or butylene glycol, which can be employed are subject to control and restriction by the various pure food laws and regulations. Furthermore, the synthetic additives are non-foods and therefore serve to detract from the food value of the finished coconut product. From a marketing and sales point of view the addition of synthetic hygroscopic agents also presents obvious disadvantages since it is always desirable to avoid the introduction of synthetic chemicals into food products wherever possible.

The use of liquid honey as a natural hygroscopic agent for shredded coconut offers many advantages over the synthetic materials.

(1) Honey is a natural product having well-recognized food value. Honey comprises primarily a watery solution of levulose and dextrose, both of which are invert sugars or monosaccharides. The monosaccharides may be characterized as partially hydrolyzed or predigested which condition renders them readily assimilable. Other natural sugars, including the disaccharides such as sucrose, lactose, and maltose, and the polysaccharides such as starch, dextrin and glycogen, must be hydrolyzed to monosaccharides during the digestive process before they can be assimilated in the blood stream. As a result of the superior food value of the monosaccharides it will be apparent that the honey treated coconut product of my invention constitutes an excellent food product having great sales appeal and marketability. Furthermore, honey being a natural product, no substantial problem of complying with the pure food regulations is encountered. Moreover, relatively large quantities of honey may be employed with the coconut, if desired, in contrast to the limited amounts of synthetic hygroscopic agents which can be added.

(2) Liquid honey is an excellent hygroscopic agent as a result of its levulose content. In this connection it is significant to note that honeys which are rich in levulose are not prone to granulate. Because of its hygroscopic properties, liquid honey can replace the synthetic humectants heretofore employed with shredded coconut. The natural moisture content of liquid honey averages about 18% by weight but in individual cases may range up to 20–23% by weight. The honey-treated coconut product of the present invention may contain from about 5% to about 15% by weight of moisture.

(3) Honey is a natural sweetening agent which reduces the amount of sugar syrup ordinarily employed for flavoring purposes. In general, one gallon of honey containing slightly more than 9 pounds of total sugars has a sweetening power equivalent to approximately 11¼ pounds of granulated sugar.

(4) Honey is normally cheaper than an equivalent amount of the glycerine or propylene or butylene glycol heretofore employed. Also, as mentioned above, the use of honey effects a further economy by reducing the amount of sugar syrup required.

(5) Honey possesses excellent preservative powers and therefore serves not only to maintain a high moisture content in the coconut product, but also discourages mold growth. Honey in its natural state and at its natural moisture content ranging up to about 20–23% by weight is known to keep for many years without spoilage. For this reason, the combination of liquid honey and coconut is more resistant to spoilage and mold formation than the combination of sugar with coconut. Accordingly, to the extent that honey can be employed to replace sugar syrup, the stability of the finished coconut product is greatly enhanced.

(6) Honey has a marked effect on the flavor of the shredded coconut in that it tends to intensify or accentuate the original coconut flavor and may, by the use of a strongly flavored honey when desired, add its own flavor to that of the coconut. Dependent upon the type and source of the honey employed, coconut products of varying flavor may be obtained.

(7) Honey possesses a natural "freshness" which is highly desirable in baked goods. Accordingly, the coconut product of the present invention is particularly well suited for use in baking since the honey will impart a characteristic "freshness" and flavor to the baked goods.

(8) In addition to its obvious food value, honey also contains certain vitamins and minerals in effective amounts and in forms which are readily assimilable.

(9) Honey also has an appreciable enzyme content which may be of particular benefit when the coconut product of the present invention is to be employed in baking.

(10) As a result of the physical properties of liquid honey, it is deposited on the coconut shreds in the form of a continuous coating or film. The enclosing film of honey around each coconut shred tends to retard diffusion of the natural coconut oils and therefore tends to reduce the oxidation of these oils and resultant rancidity which occur upon contact with the air. In addition to the obvious desirability of preventing rancidity of the coconut oils, a considerable sales advantage is also achieved by the product of the present invention. The packaged coconut products previously available often become unsightly and oily after a considerable period on the shelf as a result of the diffusion of the coconut oils to the outer surfaces of the shreds and thence to the package. The product of the present invention may be stored in packaged condition for relatively long periods of time without unsightly oiliness.

Any convenient method may be employed for adding the liquid honey to the shredded coconut. For example, desiccated coconut shreds may be treated in a rotating mixing kettle by pouring, atomizing, spraying, or otherwise adding to the dried coconut shreds a mixture of liquid honey, aqueous sugar syrup, and any other desired additive such as salt. This technique results in a relatively even distribution of water throughout the shreds of coconut. The treated coconut particles may then be dried to the desired moisture content. Any tendency of the coconut toward loss of moisture during storage will be counteracted by the presence of the honey which, as previously mentioned, possesses excellent preservative properties even at its relatively high normal moisture level. By this process it is therefore possible to obtain a coconut product having a moisture content equal to or higher than that heretofore obtainable by the use of glycerine or glycol and at the same time partaking of the natural preservative properties of honey.

Various types of honey may be employed such as buckwheat honey, clover honey, etc. For most purposes it will be desirable to employ a grade of water-white honey although the darker grades of honey can be employed if desired. In the case of the darker grades of honey it may be expedient in many instances to subject the honey to pretreatment for purposes of decolorization and deflavoring. Such pretreatment may comprise, for example, heating the liquid honey to a temperature of from about 125° F. to about 175° F. and filtering through a bed of adsorbent material such as diatomaceous earth, charcoal, etc., or treating with a resin ion exchange agent. The amount of honey which may be added to or composited with the coconut may range from about 2% to about 15% by weight of the coconut, and preferably from about 5% to about 10%. As previously pointed out, there are no serious limiting factors on the amount of honey which may be employed.

The following specific example illustrates in detail one method by which the coconut product of the present invention may be prepared:

Into a revolving confectioner's kettle 200 pounds of desiccated shreds of edible coconut are introduced. While the kettle is rotated a mixture of 15 pounds of water-white liquid honey, 9 gallons of sugar syrup (approximately 59 pounds of sugar and 31 pounds of water), and ¾ pound of salt is poured over the coconut. The temperature of the mix during rotation of the kettle is maintained at about 125° F. and the mixing step is continued for 30 to 40 minutes to obtain a thorough and uniform coating of the coconut shreds. The treated coconut is discharged from the kettle on to a belt conveyor and heated dry air is circulated over the treated coconut to reduce its moisture content to a uniform desired level, for example, about 8% by weight. However, a moisture content up to 15% and higher is entirely feasible dependent upon the amount of honey employed.

I claim:

1. A coconut product comprising shredded coconut and liquid honey as a hygroscopic agent for said coconut.

2. A coconut product containing from about 2% to about 15% by weight of liquid honey as a hygroscopic agent.

3. A palatable, edible coconut product containing from about 5 to about 15 weight per cent moisture and from about 2 to about 15 weight per cent liquid honey as a hygroscopic agent.

4. As a food product, shredded coconut composited with from about 2 to about 15 weight per cent liquid honey as a hygroscopic agent.

5. As a food product shredded coconut composited with from about 5 to about 10 weight per cent liquid honey as a hygroscopic agent.

6. A process for preparing an edible coconut product which comprises compositing shredded coconut with from about 2 to about 15 weight per cent liquid honey.

7. A process for preparing an edible coconut product which comprises compositing shredded coconut with from about 5 to about 10 weight per cent liquid honey.

8. A process for preparing an edible coconut product which comprises filtering liquid honey at a temperature of from about 125° F. to about 150° F., treating the filtered honey to remove undesirable flavor therefrom, and compositing shredded coconut with from about 2 to about 15 weight per cent of thus treated honey.

WALTER F. STRAUB.

REFERENCES CITED

The following references are of record in the file of this patent:

UNITED STATES PATENTS

| Number | Name | Date |
| --- | --- | --- |
| 1,158,297 | Root | Oct. 26, 1915 |
| 1,911,882 | Crane | May 30, 1933 |
| 2,338,184 | Kaufman | Jan. 4, 1944 |

OTHER REFERENCES

"Desiccating Shredded Coconut" by A. E. Buchanan, Jr., Food Industries, Oct., 1928, pages 9-12.